United States Patent
Inskeep

(10) Patent No.: US 9,843,208 B2
(45) Date of Patent: Dec. 12, 2017

(54) HIGH POWER RECHARGEABLE FLASHLIGHT WITH TWO WAY UNIVERSAL SERIAL BUS

(71) Applicant: Mathew Inskeep, Highland Beach, FL (US)

(72) Inventor: Mathew Inskeep, Highland Beach, FL (US)

(*) Notice: Subject to any disclaimer, the term of this patent is extended or adjusted under 35 U.S.C. 154(b) by 0 days.

(21) Appl. No.: 15/293,543

(22) Filed: Oct. 14, 2016

(65) Prior Publication Data

US 2017/0033583 A1  Feb. 2, 2017

Related U.S. Application Data

(63) Continuation-in-part of application No. 14/321,895, filed on Jul. 2, 2014, now Pat. No. 9,515,419.

(60) Provisional application No. 61/865,811, filed on Aug. 14, 2013.

(51) Int. Cl.
| | |
|---|---|
| H01R 27/00 | (2006.01) |
| H02J 7/00 | (2006.01) |
| F21L 4/08 | (2006.01) |
| H05B 33/08 | (2006.01) |
| F21Y 115/10 | (2016.01) |
| F21V 23/06 | (2006.01) |

(52) U.S. Cl.
CPC ........... *H02J 7/0054* (2013.01); *F21L 4/085* (2013.01); *H02J 7/0045* (2013.01); *H05B 33/0803* (2013.01); *H05B 33/0815* (2013.01); *F21V 23/06* (2013.01); *F21Y 2115/10* (2016.08); *H02J 2007/0062* (2013.01)

(58) Field of Classification Search
CPC ............. H02J 7/0054; H02J 7/0045; H02J 2007/0062; H02J 2007/0044; F21L 4/085; F21L 4/08; H05B 33/0815; H05B 33/0803; F21V 23/06; F21Y 2115/10
USPC ........................................................ 439/217
See application file for complete search history.

(56) References Cited

U.S. PATENT DOCUMENTS

| | | | | |
|---|---|---|---|---|
| 1,999,079 | A * | 4/1935 | Blake ....................... | F21L 4/085 200/60 |
| 8,575,887 | B1 * | 11/2013 | Pomare ................ | H02J 7/0044 136/291 |
| 2012/0294470 | A1 * | 11/2012 | Saltalamacchia ........ | A46B 5/02 381/334 |
| 2013/0343042 | A1 * | 12/2013 | Windom ................... | F21L 4/08 362/183 |
| 2014/0240967 | A1 * | 8/2014 | Sharrah ..................... | F21L 4/08 362/183 |

\* cited by examiner

*Primary Examiner* — Jean F Duverne

(57) ABSTRACT

A high power rechargeable flashlight with two-way universal serial bus (USB) capable of recharging electronic devices as well as recharging itself. A bidirectional universal serial bus (USB) adaptor port that can be integrated into a high power rechargeable battery operated flashlight or other rechargeable battery operated device. The invention can utilize a micro-controller to convert a single USB adaptor port into either an input device or an output device. A high power rechargeable flashlight with bidirectional USB adaptor port is capable of recharging external electronic devices, as well as recharging itself through the same port.

18 Claims, 3 Drawing Sheets

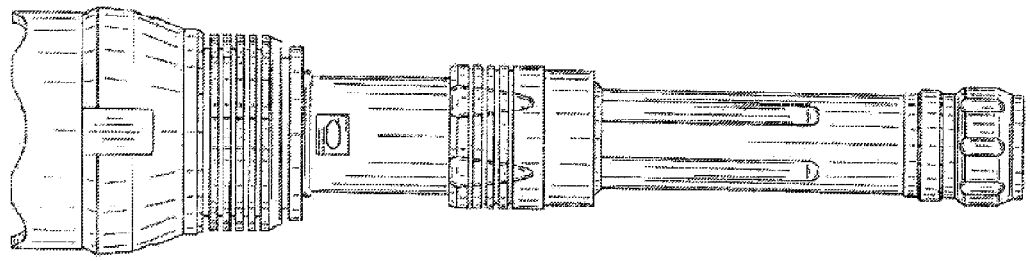
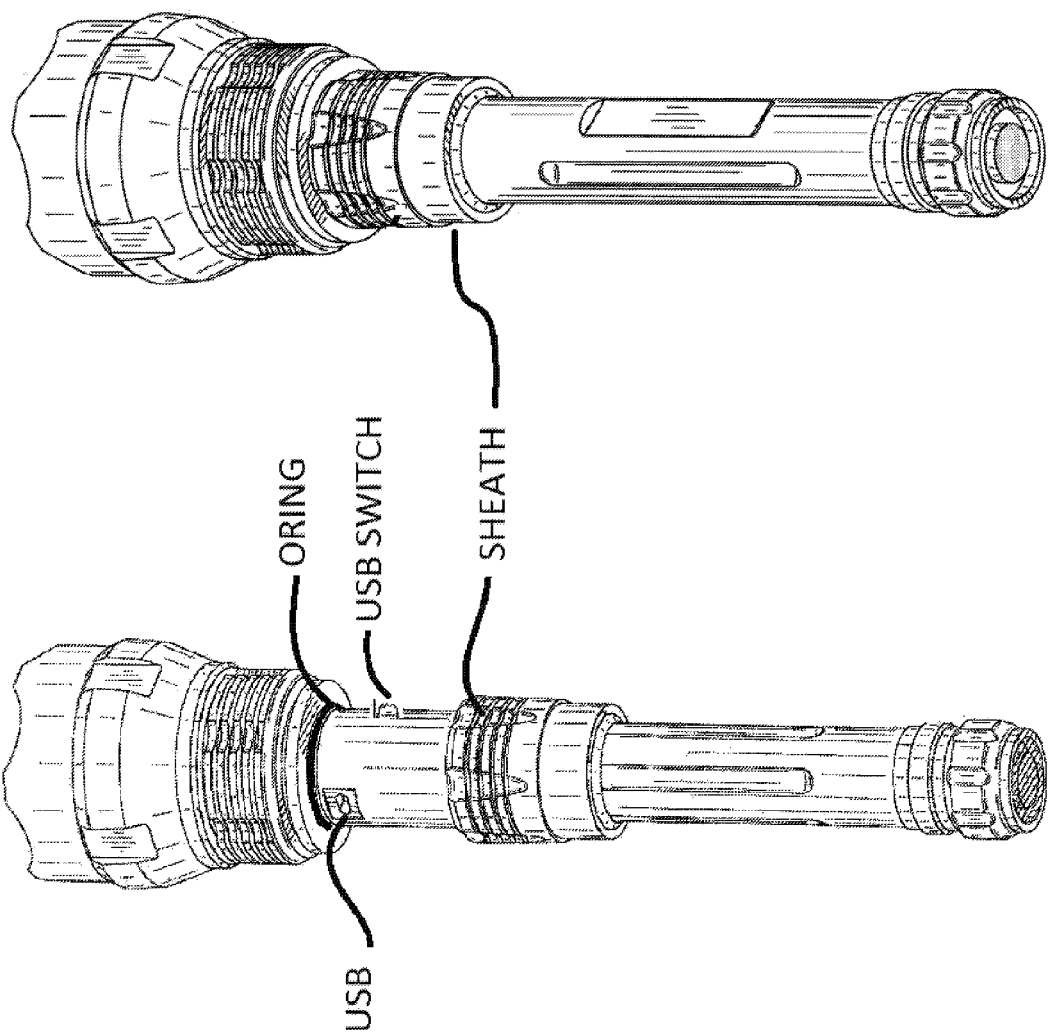
FIG. 3A  FIG. 3B  FIG. 3C

US 9,843,208 B2

HIGH POWER RECHARGEABLE FLASHLIGHT WITH TWO WAY UNIVERSAL SERIAL BUS

This application is a continuation-in-part of U.S. application Ser. No. 14/321,895, filed Jul. 2, 2014, which claims the benefit of and priority to U.S. Provisional Patent Application Ser. No. 61/865,811, filed Aug. 14, 2013.

BACKGROUND

Flashlights are useful portable devices that provide light to users in the event of power outages, nighttime outdoor activities and many other circumstances. Typically, flashlights do not have any other electrical functions besides providing a portable light source. The current disclosure is directed to increase the functionality of certain electronic devices, such as, but not limited to, flashlights.

SUMMARY OF THE DISCLOSURE

A handheld flashlight in one non-limiting embodiment is disclosed with integrated portable power capabilities via a two-way universal serial bus (USB), which allows for combining the utility of a flashlight and a backup power source for recharging various electronic devices that can be electrically connected to the flashlight at the USB port.

Disclosed is an electronic device, such as, but not limited to, a high power rechargeable flashlight with a two-way universal serial bus (USB). This handheld flashlight with integrated portable power capabilities via a two-way universal serial bus provides the utility of a traditional flashlight with the benefit of on the go backup power. Flashlights are useful portable light sources and are common to almost every home. With our increased reliance on smart phones, tablet style computers and related portable devices, backup power is essential when away from a primary charging source such as a home outlet or automobile. The disclosed electronic device with its universal serial bus with the assistance of an adapter is capable of powering and transferring energy to small rechargeable electronic devices. Additionally, the disclosed electronic device uses the same universal serial bus to draw energy from an external adapter to recharge its own internal battery. The disclosed electronic device utilizes USB adapters and modifies their electrical characteristics to allow the adapter to serve the two purposes of both powering and transferring energy to small electronics or recharging itself through the same port. Currently, other market available designs required dual adapters to accomplish this function. The user can take advantage of the disclosed electronic device by having a built-in USB adapter port that can recharge and power their small portable devices as well as acting as a rechargeable light source, namely a flashlight.

Thus, in one non-limiting embodiment, a flashlight is disclosed having a bidirectional USB Port. The electrical device provides a single electrical/USB port that can both recharge its own internal battery (i.e. inputting energy through the port) and also use the internal battery to power/charge an external electrical device (i.e. outputting energy through the port).

BRIEF DESCRIPTION OF THE DRAWINGS

FIGS. 3A, 3B and 3C shows a perspective view of the preferred embodiment of a flashlight with a built in universal serial bus (USB), while also illustrating a movable (screwed up/down or slidable) sheath that can be provided and which can cover the USB port and USB switch, when the USB port is not in use.

DETAILED DESCRIPTION

Figure 1:
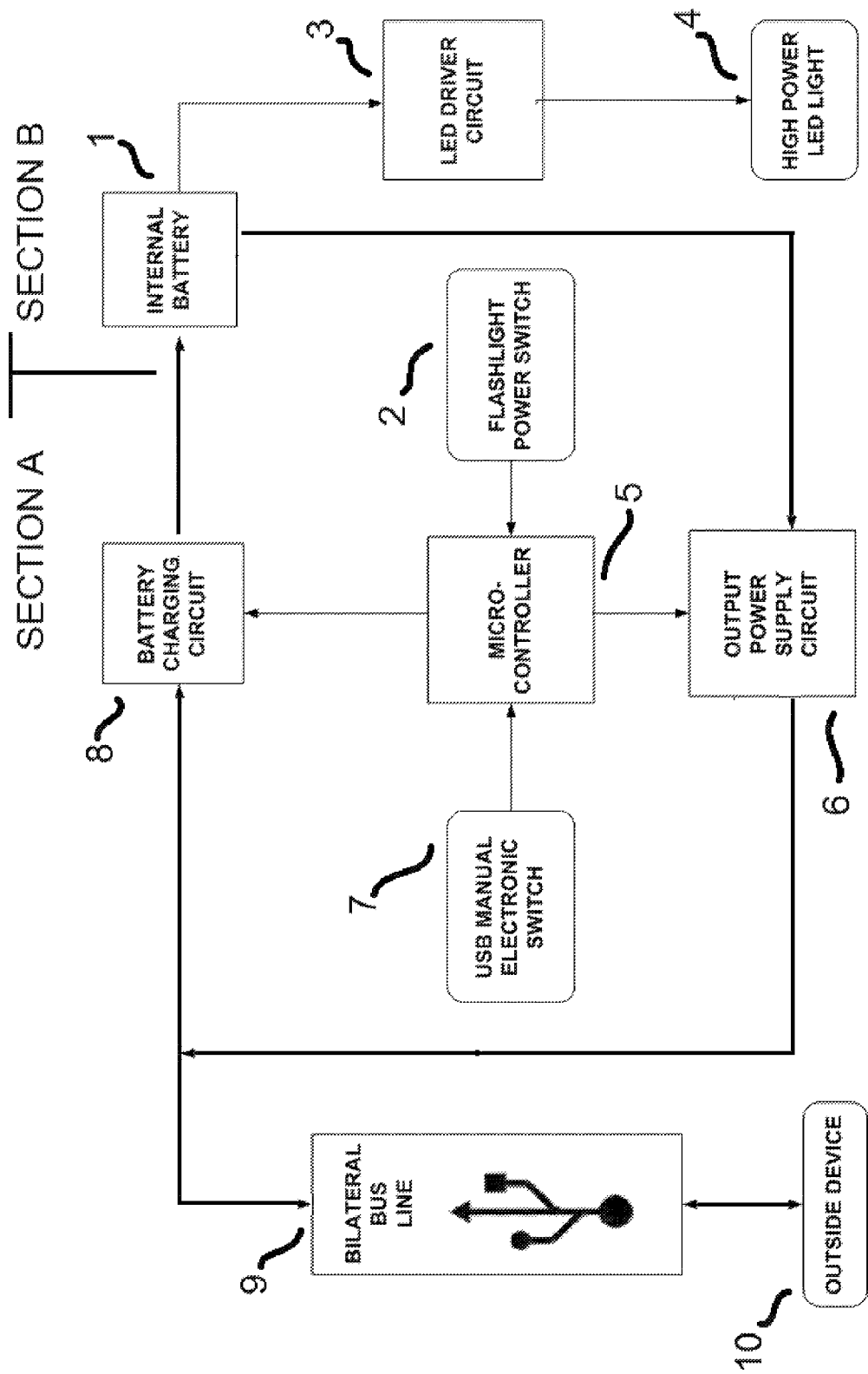
FIG. 1 is a block diagram of the internal functions of the universal serial bus (USB) control circuit for an electronic device and including the function of the rechargeable high power LED flashlight as one non-limiting embodiment for the electronic device.
Figure 2:
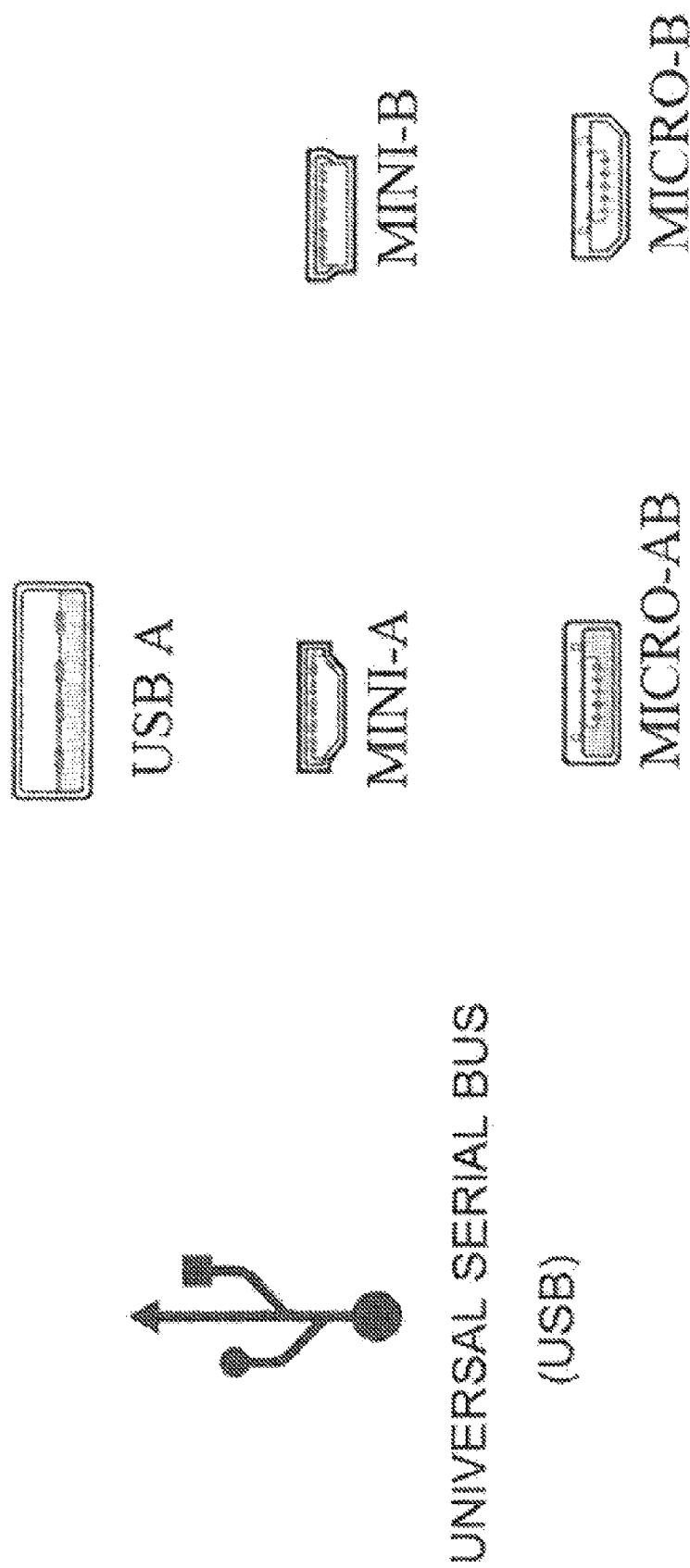
FIG. 2 is a physical appearance of various universal serial ports available that can be used in combination with the flashlight.

FIG. 1 shows an internal diagram for the disclosed novel rechargeable electronic device and portable power source and its major electrical components. The circuitry can be divided into section A and section B. Section A describes the preferred major components and internal circuits of the bidirectional universal serial bus (USB) 9 circuit operation. Section B shows the internal circuit operation of the high power rechargeable flashlight which can be the preferred non-limiting embodiment for the electronic or electrical device.

Where the electronic device is a rechargeable device and a portable power source for charging other electrical devices, the combination of both circuits shown in FIG. 1 can be used. The USB adapter port 9 can be optimized for different situations. For example, the charging port's physical size and power carrying capabilities, to allow high efficiency power across various situations and need not be limited to only one type of adapter. It may take other form such as, without limitation, those shown in FIG. 2; USB A, Mini A, Micro AB, as well as other currently known or later developed adapters. Also, adapter port's 9 can provide for mechanically and electrically coupling the electronic device with any external electronic/electrical device with similar connectivity 10. The external device 10 can be directly coupled to the USB adapter port 9 or through an adapter USB extension cord.

In Section B of FIG. 1, an electronic device, such as, but not limited to, the High Power Rechargeable Flashlight shown in FIG. 3, can be controlled when the flashlight power switch 2 is pressed/selected which causes a signal to be sent to the micro-controller 5 to tell it that the flashlight mode is active and therefore disable all other features. The LED driver circuit 3 is powered by the internal battery 1 which is used for powering LED light 4. It should also be recognized other types of light bulbs, in addition to LED light bulbs can be used and are considered within the scope of the disclosure. Here current flows from the internal battery, to the LED driver circuit 3 and finally into the high powered LED light 4. Thus, when the flashlight power switch 2 is selected, the flashlight mode is active and the USB/adapter 9 can be deactivated.

In order to charge/recharge internal battery 1 through battery charging circuit 8 or to charge/recharge an outside device 10 by output power supply circuit 6 with power/energy from internal battery 1, the USB manual electronic switch 7 is pressed/selected. Depending on which of these two uses is desired (i.e. whether an external device 10 is coupled to adapter port 9 to be recharged or battery 1 is to be recharged) determines whether the circuitry converts the USB adapter 9 into an input or output device where current is drawn from an external adapter to recharge the internal battery 1 or energy/power is outputted out of adapter 9 to recharge the outside device 10. Upon the selection of switch 7 and depending on what is coupled to adaptor 9, the micro-controller 5 processes this information and allows the current to flow in or out from the USB adapter port 9. Where current flows in from adapter 9, the direction of flow is to the battery charging circuit 8 for charging the internal battery 1. The charging circuit 8 can be a switching regulator. One of its functions can be is to limit the current and voltage potential to the internal battery 1 received from the USB adapter port 9, which can be five volt of direct current as per industry standard, though such is not considered limiting.

Where current flows out of adapter 9, the direction of current flow can be from internal battery 1 to output power supply circuit 6 out of adapter 9 and to the outside device 10 for recharging outside device 10. Thus, the second function of the universal serial bus (USB) 9 is to output and transfer energy from the internal battery 1 into small rechargeable electronic devices such as mobile phones, digital cameras, mp3 and similar consumer products Either mode (i.e. current in or current out) of use for the bilateral bus line/adapter 9 can be activated when the user selects to use the USB manual electronic switch 7. Preferably, the flashlight mode is deactivated upon selecting switch 7, though such is not considered limiting. The electronic switch 7 sends a signal to the micro-controller 5 indicating to toggle to one of the USB functions, such as, turning the USB adapter port 9 into a power sourcing device or for recharging internal battery 1. When used as a sourcing device, sourcing device means that the energy transfer will now flow from the internal battery 1 out to the external device 10. This can be accomplished by preferably having the micro-controller 5 send a signal to the output power supply circuit 6 to activate and transfer the energy from the internal battery 1 into the USB adapter port 9. The power supply circuit 6 can be a buck regulator that lowers the higher potential voltage from the battery typically above seven volt of direct current down to five volt of direct current which is the industry standard output voltage of a USB adapter port 9. The power supply circuit 6 allows control of the maximum current deliver to the external device 10.

Thus, it is preferred that the power switch 2 for turning the flashlight on and off can be independent of the USB manual electronic switch 7 which is used for activating USB port 9 for recharging internal battery 1 or charging a coupled external device 10.

The circuitry shown in FIG. 1 provides for a bi-directional electrical connection from an outside device 10 and the internal battery 1. The basic operation is the electrical transmission occurring between these two components which can be mechanically coupled through a single universal serial bus adapter 9. When an outside device 10 demands energy from the internal battery 1 the outside device acts as a load to the internal battery 1 or when an outside device is transferring energy to the internal battery 1 the outside device acts as energy source to the internal battery. Similarly, the internal battery 1 is fit to be a load or a source to an outside device. Thus, both the outside device and internal battery 1 can be a source or a load at times; but they are always electrically opposite to each other while in their predetermined mode (if one device is a source, the other is a load and vice versa). The bi-directional lines shown in FIG. 1 are used for describing both modes of operation. The disclosed novel electronic device accommodates both modes of operation using the same universal serial bus adapter 9 and switching the electrical flow of energy utilizing a single universal serial bus.

FIG. 3 illustrates one non-limiting flashlight embodiment for the electronic device, and specifically showing a protective sheath component of the flashlight in different positions to either cover adaptor port 9 (FIG. 3B) or expose or otherwise provide access to port 9 (FIG. 3A and FIG. 3B). As shown, In one non-limiting embodiment, the sheath can screw up and down the flashlight body to cover the USB port 9. Though a flashlight is shown, a sheath can also be provided with other electronic devices incorporating the disclosed bilateral bus line with adapter port 9 and such other electronic devices are considered within the scope of the disclosure.

The sheath provides for protection to an otherwise unprotected electrical output of the universal serial bus and its associated power switch. Preferably, the protective sheath mechanically couples to the main body of the electronic device/flashlight and can form a closure to the top light assembly head. Preferably the sheath screws up and down (or can be slidable), traveling along the main body. When the sheath is fully screwed up (it has traveled the full extent it can upward along the main body), it can provide protection to the otherwise exposed electrical circuit against water ingression, dirt, dust and other atmospheric elements. In one non-limiting embodiment, the sheath can be fabricated into the body of the electronic device/flashlight and is preferably not removable by normal operational means. The full extension or travel of the sheath also can protect the USB power switch. To access the universal serial port 9 (and USB power switch 7), the user simply twists or screws the cap clockwise or counter clockwise or slides the cap down.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described combination lighting device and their locations, electronic communication methods between the system components, wiring, adapter/port types, attachment or securement mechanisms, dimensions, values, body shapes, etc. discussed above or shown in the drawings, if any, are merely by way of example and are not considered limiting and other component(s) and their locations, electronic communication methods, wiring, adapter/port types, attachment or securement mechanisms, dimensions, values, body shapes, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the electronic device/flashlight has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A flashlight for providing light and powering an external electrical device directly or indirectly connected to the flashlight, said flashlight comprising:
   a body member formed in a shape of a flashlight body, the body member having a first end and a second end,
   a light member disposed at the first end of the body member;
   a light circuit in communication with the light member for energizing the light member under certain conditions, the light circuit disposed within the body member;
   a single bidirectional electrical port accessible through the body member;
   a rechargeable battery in communication with the light circuit and the single bi-directional port, the rechargeable battery disposed within the body member; and
   a microcontroller disposed within the body member and programmed to allow energy from an external source to travel in a first direction and enter through the single electrical port to recharge the rechargeable battery and also programmed to allow energy from the rechargeable battery to travel in a second direction opposite of the first direction travel and exit through the single electrical port to provide energy to power an external electrical device electrically connected directly or indirectly to the flashlight at the single bidirectional electrical port;
   wherein the microcontroller is programmed to allow either the recharging of the rechargeable battery through the electrical port or the powering of the external electrical device connected at the electrical port at a specific instant in time but not both at the same time.

2. The flashlight of claim 1 further comprising a first switch in communication with the microcontroller for controlling operation of the light member.

3. The flashlight of claim 2 wherein when the first switch is selected by a user, the microcontroller is programmed to disable operations through the single electrical port.

4. The flashlight of claim 2 further comprising a second switch in communication with the microcontroller for controlling activating the single electrical port for inputting and outputting energy through the single electrical port.

5. The flashlight of claim 1 further comprising a sheath member secured to the body member, said sheath member movable from a first position where the sheath member is positioned with respect to the body member such that it covers the single electrical port to a second position where the sheath member is positioned with respect to the body member such that the single electrical port is exposed and accessible for use.

6. The flashlight of claim 1 further comprising a battery charging circuit in communication with the rechargeable battery and in communication with the single electrical port, the battery charging circuit disposed within the body member, the battery charging circuit also in communication with the microcontroller.

7. The flashlight of claim 1 further comprising an output power supply circuit in communication with the microcontroller and with the rechargeable battery, the output power supply circuit disposed within the body member and when directed by the microcontroller used for directing energy from the rechargeable battery out of the single bidirectional electrical port and into the external electrical device connected directly or indirectly at the single bidirectional electrical port in order to power the external electrical device.

8. The flashlight of claim 1 wherein the single electrical port is a USB A port, a MINI-A port, a MINI-B port, a MICRO-AB port or a MICRO-B port.

9. The flashlight of claim 1 wherein the single bidirectional electrical port has input and output energy transfer functionalities.

10. The flashlight of claim 1 wherein the single electrical port is a universal serial bus adapter port.

11. The flashlight of claim 1 wherein the single electrical port is a two-way port and acts as an input device when recharging the rechargeable battery and the acts as an output device when the rechargeable battery is providing power for the external second electrical device.

12. The flashlight of claim 2 wherein the microcontroller is programmed such that when a user presses the first switch the rechargeable battery is permitted to provide energy to the light member in connection with the light circuit.

13. The flashlight of claim 6 wherein the battery charging circuit is a switching regulator.

14. The flashlight of claim 1 wherein the external electrical device is adapted for electrical or mechanical coupling to the single electrical port directly or through a cord.

15. The flashlight of claim 7 wherein the output power supply circuit is a buck regulator.

16. A flashlight for providing light and powering charging an external electrical device, said flashlight comprising:
   a body member formed in a shape of a flashlight body, the body member having a first end and a second end,
   a light member disposed at the first end of the body member;
   a light circuit in communication with the light member for energizing the light member under certain conditions, the light circuit disposed within the body member;
   a universal serial bus (USB) port with bidirectional capabilities with input and output energy transfer functionalities, said USB port accessible through the body member;
   a rechargeable battery in communication with the light circuit, the rechargeable battery disposed within the body member;
   a microcontroller disposed within the body member;
   a first switch in communication with the microcontroller for controlling operation of the light member; and
   a second switch in communication with the microcontroller for controlling activating the USB port for inputting or outputting energy through the USB port;
   an output power supply circuit in communication with the microcontroller and with the rechargeable battery, the output power supply circuit disposed within the body member and when directed by the microcontroller used for directing energy from the rechargeable battery out of the single bidirectional electrical port and into the external electrical device connected directly or indirectly at the single bidirectional electrical port in order to power the external electrical device;

wherein the microcontroller is programmed such that when a user selects the first switch the rechargeable battery is permitted to provide energy to the light member in connection with the light circuit and the microcontroller is also programmed to disable operations through the USB port;

wherein when the second switch is selected by the user the microcontroller is programmed to allow energy from an external source to enter through the USB port and recharge the rechargeable battery and to allow energy from the rechargeable battery to exit through the USB port to provide energy to an external electrical device, but not both at a same time;

wherein the USB port is a two-way port and acts as an input device when recharging the rechargeable battery and the acts as an output device when the rechargeable battery is providing power for the external second electrical device.

17. The flashlight of claim 16 further comprising a battery charging circuit in communication with the rechargeable battery and in communication with the USB port, the battery charging circuit disposed within the body member, the battery charging circuit also in communication with the microcontroller.

18. The flashlight of claim 16 wherein the external electrical device is adapted for electrical or mechanical coupling to the USB port directly or indirectly through a cord.

* * * * *